United States Patent
Endou et al.

(10) Patent No.: US 12,458,628 B2
(45) Date of Patent: Nov. 4, 2025

(54) CANCER THERAPEUTIC

(71) Applicant: J-Pharma Co., Ltd., Yokohama (JP)

(72) Inventors: Hitoshi Endou, Yokohama (JP); Junji Furuse, Mitaka (JP); Isao Okayasu, Tokyo (JP); Michael F. Wempe, Aurora, CO (US)

(73) Assignee: J-PHARMA CO., LTD., Yokohama (JP)

( * ) Notice: Subject to any disclaimer, the term of this patent is extended or adjusted under 35 U.S.C. 154(b) by 666 days.

(21) Appl. No.: 16/957,293

(22) PCT Filed: Aug. 1, 2018

(86) PCT No.: PCT/JP2018/028887
§ 371 (c)(1),
(2) Date: Jun. 23, 2020

(87) PCT Pub. No.: WO2019/130637
PCT Pub. Date: Jul. 4, 2019

(65) Prior Publication Data
US 2020/0405695 A1    Dec. 31, 2020

(30) Foreign Application Priority Data

Dec. 28, 2017 (JP) .................. 2017-253385

(51) Int. Cl.
*A61K 31/423* (2006.01)
*A61P 35/00* (2006.01)

(52) U.S. Cl.
CPC ............ *A61K 31/423* (2013.01); *A61P 35/00* (2018.01)

(58) Field of Classification Search
CPC ...... A61K 31/423; A61K 9/19; A61K 9/0019; A61K 9/001; A61P 35/00
See application file for complete search history.

(56) References Cited

U.S. PATENT DOCUMENTS

2016/0279103 A1    9/2016    Endou et al.

FOREIGN PATENT DOCUMENTS

| CN | 105392498 A | 3/2016 |
|---|---|---|
| EP | 2959918 A1 | 12/2015 |
| JP | 2017-155023 A | 9/2017 |
| JP | 2021-38214 A | 3/2021 |
| WO | 2008/081537 A1 | 7/2008 |
| WO | 2015/173970 A1 | 11/2015 |
| WO | 2019/093383 A1 | 5/2019 |
| WO | 2021/040042 A1 | 3/2021 |
| WO | 2022/102687 A1 | 5/2022 |

OTHER PUBLICATIONS

Oda, K., "L-type amino acid transporter 1 inhibitors inhibit tumor cell growth." Cancer science 101.1 (2010): 173-179.*
Yamauchi, K., "System L amino acid transporter inhibitor enhances anti-tumor activity of cisplatin in a head and neck squamous cell carcinoma cell line." Cancer letters 276.1 (2009): 95-101.*
Yanagisawa, N., "High expression of L-type amino acid transporter 1 as a prognostic marker in bile duct adenocarcinomas." Cancer medicine 3.5 (2014): 1246-1255.*
Hvidberg, H., "Development of a long-term ascending urinary tract infection mouse model for antibiotic treatment studies." Antimicrobial agents and chemotherapy 44.1 (2000): 156-163.*
Hayashi, K., "Novel therapeutic approaches targeting L-type amino acid transporters for cancer treatment." World Journal of Gastrointestinal Oncology 9.1 (2017): 21.*
Parks, S. K., "Hypoxia and cellular metabolism in tumour pathophysiology." The Journal of physiology 595.8 (2017): 2439-2450.*
Toyoshima, J., "Investigation of the role of transporters on the hepatic elimination of an LAT1 selective inhibitor JPH203." Journal of Pharmaceutical Sciences 102.9 (2013): 3228-3238.*
Wempe et al., Drug Metab. Pharmacokinet., 2012, 27, 155-161 (Year: 2012).*
J-Pharma Co, Ltd. Press Release entitled "Completion of Phase I clinical trial of novel anti-cancer agent JPH 203," Jan. 18, 2018, https://www.j-pharma.com/assets/images/pressrelease_20180119_e.pdf (Year: 2018).*
Okano et al., Journal of Clinical Oncology, Feb. 2018, vol. 36, abstract 419, https://ascopubs.org/doi//10.1200/JCO.2018.36.4_supl.419 (Year: 2018).*
Okano et al., Journal of Clinical Oncology, Jun. 2018, vol. 36, abstract 2519, https://ascopubs.org/doi/10.1200/JCO.2018.3615_suppl.2519 (Year: 2018).*
MeSH Descriptor Data 2025, Biliary Tract Neoplasms, last revised Jul. 9, 2003, retrieved from https://meshb.nlm.nih.gov/record/ui?ui=D001661 on Jan. 15, 2025 (Year: 2003).*

(Continued)

*Primary Examiner* — John S Kenyon
*Assistant Examiner* — Sara Elizabeth Bell
(74) *Attorney, Agent, or Firm* — WHDA, LLP

(57) ABSTRACT

O-(5-amino-2-phenylbenzoxazol-7-yl)methyl-3,5-dichloro-L-tyrosine or a pharmacologically acceptable salt thereof exhibits high therapeutic effects on bile duct cancer, colorectal cancer, esophageal cancer, breast cancer, and pancreatic cancer.

11 Claims, 2 Drawing Sheets

(56) References Cited

OTHER PUBLICATIONS

International Search Report dated Sep. 4, 2018, issued in counterpart International Application No. PCT/JP2018/028887. (2 pages).
Office Action dated Apr. 14, 2020, issued in counterpart of Japanese Patent Application No. 2019-114783 with English Translation (6 pages).
Oda et al., "L-Type amino acid transporter 1 inhibitors inhibit tumor cell growth", Cancer Science, (2010), vol. 101, No. 1, pp. 173-179. Cited in ISR & JP2019114783 Office Action. (7 pages).
Kaira et al., "Clinical significance of L-type amino acid transporter 1 expression as a prognostic marker and potential of new targeting therapy in biliary tract cancer", BMC Cancer, (2013), vol. 13, No. 482, pp. 1-12. Cited in ISR & JP2019114783 Office Action. (12 pages).
Ohshima et al., "Efficacy of system L amino acid transporter 1 inhibition as a therapeutic targer in esophageal squamous cell carcinoma", Cancer Science, (2016), vol. 107, No. 10, pp. 1499-1505. Cited in ISR & JP2019114783 Office Action. (7 pages).
Wang et al., "L-type amino acid transport and cancer: targeting the mTORC1 pathway to inhibit neoplasia", Review Article, Am. J. Cancer Res., (2015), vol. 5, No. 4, pp. 1281-1294. Cited in JP2019114783 Office Action. (14 pages).
Janpipatkul et al., "Downregulation of LAT1 expression suppresses cholangiocarcinoma cell invasion and migration", Cellular Signalling, (2014), vol. 26, pp. 1668-1679. Cited in JP2019114783 Office Action. (12 pages).
Notification of Transmittal of Translation of the International Preliminary Report on Patentabililty (Form PCT/IB/338) issued in counterpart International Application No. PCT/JP2018/028887 dated Jul. 9, 2020 with Forms PCT/IB/373 and PCT/ISA/237 (19pages).
Extended European Search Report, dated Jul. 21, 2021, issued in counterpart European Application No. 18894766.7 (8 pages; in English).
Yothaisong et al., "Inhibition of L-type amino acid transporter I activity as a new therapeutic target for cholangiocarcinoma treatment", Tumor Biology, 2017, vol. 39, No. 3, pp. 1-14, cited in JP Office Action dated Aug. 30, 2022. (14 pages).
Fuji et al., "Evidence-based guidelines for the management of biliary tract cancer", Okayama Medical Society Journal, 2010, vol. 122, pp. 249-251, with partial English translation, cited in JP Office Action dated Aug. 30, 2022. (6 pages).

* cited by examiner

CANCER THERAPEUTIC

TECHNICAL FIELD

The present invention relates to a medicament for treating cancer.

BACKGROUND ART

In tumor cells, the expression of transporters that incorporate nutrients such as sugars and amino acids from the outside is enhanced in order to maintain rapid cell proliferation and increased intracellular metabolism. In particular, L-type amino acid transporter 1 (LAT1), a transporter specifically expressed in tumor cells, transports essential amino acids including leucine, a signaling factor, and plays an important role in providing essential nutrients to tumor cells. In contrast, L-type amino acid transporter 2 (LAT2) is known to be widely expressed in normal cells. Thus, compounds having selective inhibitory activity against LAT1 may be anti-cancer agents with few side effects.

As a compound having a selective inhibitory activity against LAT1, O-(5-amino-2-phenylbenzoxazol-7-yl) methyl-3,5-dichloro-L-tyrosine (hereinafter also referred to as JPH203) represented by the following formula is known (Patent Literature 1).

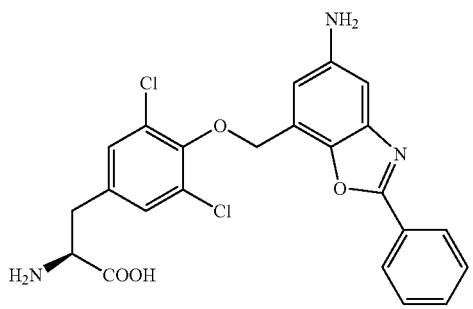 [SMILES: Nc1cc(COc2c(Cl)cc(C[C@H](N)C(=O)O)cc2Cl)c2oc(-c3ccccc3)nc2c1]

Furthermore, an injection containing JPH203 is disclosed in Patent Literature 2.

CITATION LIST

Patent Literature

Patent Literature 1: WO 2008/081537
Patent Literature 2: Japanese Unexamined Patent Publication No. 2017-155023

SUMMARY OF INVENTION

Technical Problem

An object of the present invention is to provide a novel medicament for treating cancer.

Solution to Problem

The present inventors have conducted intensive researches, and as a result, have found that JPH203 exhibits a high therapeutic effect (tumor shrinkage effect and/or overall survival prolonging effect) on certain cancers, and completed the present invention.

The present invention provides the following [1] to [6].

[1] A medicament for treating cancer comprising: JPH203 or a pharmacologically acceptable salt thereof, wherein the cancer is bile duct cancer, colorectal cancer, esophageal cancer, breast cancer, or pancreatic cancer.

[2] A pharmaceutical composition for treating cancer comprising: JPH203 or a pharmacologically acceptable salt thereof; and a pharmaceutical excipient, wherein the cancer is bile duct cancer, colorectal cancer, esophageal cancer, breast cancer, or pancreatic cancer.

[3] A method for treating cancer, comprising: administering JPH203 or a pharmacologically acceptable salt thereof to a patient in need thereof, wherein the cancer is bile duct cancer, colorectal cancer, esophageal cancer, breast cancer, or pancreatic cancer.

[4] JPH203 or a pharmacologically acceptable salt thereof for treating cancer, wherein the cancer is bile duct cancer, colorectal cancer, esophageal cancer, breast cancer, or pancreatic cancer.

[5] Use of JPH203 or a pharmacologically acceptable salt thereof for the manufacture of a medicament for treating cancer, wherein the cancer is bile duct cancer, colorectal cancer, esophageal cancer, breast cancer, or pancreatic cancer.

[6] The medicament for treating cancer, the pharmaceutical composition for treating cancer, the method for treating cancer, the compound, or the use according to claims [1] to [5], wherein JPH203 or a pharmacologically acceptable salt thereof is administered at 1 mg/m$^2$ to 60 mg/m$^2$ at a time.

Advantageous Effects of Invention

JPH203 or a pharmacologically acceptable salt thereof exhibits high therapeutic effects on bile duct cancer, colorectal cancer, esophageal cancer, breast cancer, or pancreatic cancer.

DESCRIPTION OF EMBODIMENTS

Figure 1:
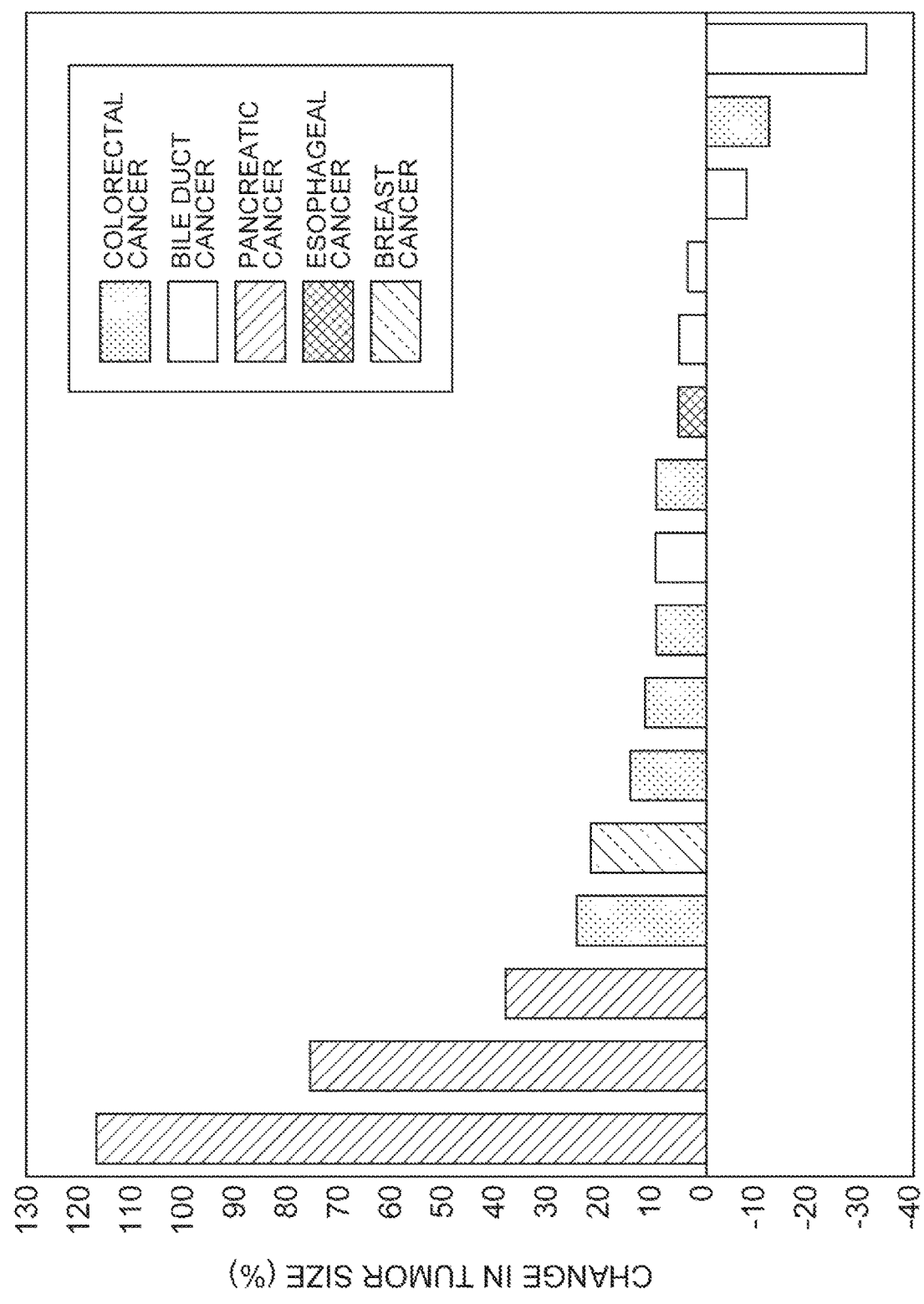
FIG. 1 is a graph showing a Waterfall plot of the phase I clinical trial results of JPH203.

JPH203 or a pharmacologically acceptable salt thereof may be produced by the method described in Patent Literature 1.

The pharmacologically acceptable salt is not particularly limited as long as it is medicinally, pharmacologically (pharmaceutically) or physiologically acceptable. Examples of such salts specifically include salts with inorganic acids, salts with organic acids, salts with inorganic bases, salts with organic bases, and salts with acidic or basic amino acids.

Preferable examples of salts with inorganic acids include salts with hydrochloric acid, hydrobromic acid, sulfuric acid, nitric acid, or phosphoric acid. Preferable examples of salts with organic acids include salts with acetic acid, succinic acid, fumaric acid, maleic acid, tartaric acid, citric acid, lactic acid, stearic acid, benzoic acid, methanesulfonic acid, ethanesulfonic acid, or p-toluenesulfonic acid.

Preferable examples of salts with inorganic bases include alkali metal salts such as sodium salts and potassium salts, alkaline earth metal salts such as calcium salts and magnesium salts, aluminum salts, and ammonium salts. Preferable examples of salts with organic bases include salts with diethylamine, diethanolamine, meglumine, or N,N-dibenzylethylenediamine.

Preferable examples of salts with acidic amino acids include salts with aspartic acid or glutamic acid. Preferable examples of salts with basic amino acids include salts with arginine, lysine, or ornithine.

Preferred pharmacologically acceptable salts are salts with inorganic acids, particularly hydrochlorides.

The medicament for treating cancer according to the present invention comprises JPH203 or a pharmacologically acceptable salt thereof. The medicament for treating cancer may also comprise pharmaceutical excipients as needed. The medicament for treating cancer may be administered orally in the form of a solid formulation such as a tablet, a granule, a fine granule, a powder, or a capsule, or in the form of a liquid, a jelly, or a syrup. The medicament for treating cancer may also be administered parenterally in the form of an injection, a suppository, or an ointment.

A preferred form of the medicament for treating cancer is an injection. The "injection" herein is used in the sense of not only an injectable solution in the final form, but also an injectable solution precursor (e.g., a liquid injection (enriched or concentrated injection) or a solid injection (lyophilized injection or the like)) capable of preparing the final injectable solution by using a dissolution solution at the time of use. The injection preferably comprises a pH adjusting agent and a cyclodextrin as pharmaceutical excipients. By containing these pharmaceutical excipients, injections with a reduced number of insoluble microparticles can be obtained and lyophilized formulations with improved re-solubility can be obtained (Patent Literature 2).

The pH adjusting agent is not particularly limited as long as it is medicinally, pharmacologically (pharmaceutically) or physiologically acceptable. Examples of such a pH adjusting agent include sodium carbonate, potassium carbonate, sodium ethoxide, potassium butoxide, alkali metal hydroxides such as sodium hydroxide or potassium hydroxide, alkali metal hydrides such as sodium hydride or potassium hydride, carbonates of alkali or alkaline earth metals, and alkali metal alkoxides.

The pH adjusting agents may be used singly or in any combinations of two or more. As the pH adjusting agent formulated for injections, sodium hydroxide and sodium carbonate are preferred, and sodium hydroxide is more preferred.

The injection may be suitably adjusted to an appropriate pH using the pH adjusting agent. The pH of the injection is preferably 3 to 6, more preferably 3 to 5, further preferably 3 to 4.5, and particularly preferably 3.5 to 4.5, from the viewpoint of reducing the number of insoluble microparticles formed even when aqueous solutions that are not strongly acidic are used and from the view point of improving re-solubility in aqueous solutions that are not strongly acidic.

The cyclodextrins are not particularly limited as long as they are medicinally, pharmacologically (pharmaceutically) or physiologically acceptable. Examples of such cyclodextrins include unmodified cyclodextrin and modified cyclodextrin. Examples of the unmodified cyclodextrin include α-cyclodextrin, β-cyclodextrin, and γ-cyclodextrin. Examples of the modified cyclodextrin include alkylated cyclodextrin (e.g., dimethyl-α-cyclodextrin, dimethyl-β-cyclodextrin, dimethyl-γ-cyclodextrin), hydroxyalkylated cyclodextrin (e.g., hydroxypropyl-α-cyclodextrin, hydroxypropyl-β-cyclodextrin, hydroxypropyl-γ-cyclodextrin), sulfoalkyl ether cyclodextrin (e.g., sulfobutyl ether-α-cyclodextrin, sulfobutyl ether-β-cyclodextrin, sulfobutyl ether-γ-cyclodextrin), and branched cyclodextrins (e.g., maltosyl-α-cyclodextrin, maltosyl-β-cyclodextrin, maltosyl-γ-cyclodextrin).

The cyclodextrins may be used singly or in any combinations of two or more. The cyclodextrins are preferably hydroxypropyl-β-cyclodextrin or sulfobutyl ether-β-cyclodextrin, and more preferably, sulfobutyl ether-β-cyclodextrin, from the viewpoint that the number of insoluble microparticles formed can be reduced even when dissolved in aqueous solutions that are not strongly acidic and from the viewpoint of improving re-solubility of lyophilized formulations in aqueous solutions that are not strongly acidic.

In regard to the content of cyclodextrins in the injection, for example, based on the total amount of the injection, the total content of cyclodextrins is preferably 5 to 50% by weight, more preferably 10 to 40% by weight, and further preferably 10 to 30% by weight.

In the injection, the ratio of the content of cyclodextrins to the content of JPH203 or a pharmacologically acceptable salt thereof is, for example, preferably 0.01 to 500 parts by mass, more preferably 0.1 to 100 parts by mass, and further preferably 1 to 50 parts by mass of the total content of cyclodextrins to 1 part by mass of the content of JPH203 or a pharmacologically acceptable salt thereof.

The injection may comprise a buffer, a suspending agent, a dissolution aid, a stabilizer, an isotonic agent, a preservative, and the like.

Examples of the buffer include borate buffers, phosphate buffers, carbonate buffers, citrate buffers, acetate buffers, tris buffers, aspartic acid, aspartate, and epsilon-aminocaproic acid.

Examples of the suspending agent include methylcellulose, polysorbate 80, hydroxyethylcellulose, gum arabic, tragacanth powder, sodium carboxymethylcellulose, and polyoxyethylene sorbitan monolaurate.

Examples of the dissolution aid include polyoxyethylene hydrogenated castor oil, polysorbate 80, nicotinic acid amide, polyoxyethylene sorbitan monolaurate, macrogol, and glycerin fatty acid esters.

Examples of the stabilizer include sodium sulfite and sodium metasulfite.

Examples of the isotonic agent include glucose, mannitol, and sorbitol.

Examples of the preservative include methyl paraoxybenzoate, ethyl paraoxybenzoate, sorbic acid, phenol, cresol, and chlorocresol.

The injection may be a lyophilized formulation. The lyophilized formulation may be used as a type of injection that is prepared by dissolution just before use, for example, by dissolving in one or two or more solvents selected from distilled water for injection, infusion [electrolyte solution (saline, Ringer's solution, or the like), nutritional infusion, protein amino acid injection solution, vitamin injection solution, or the like], alternative blood combining electrolyte solution and nutritional infusion (sugar solution, or the like), fat emulsion in which a fat is emulsified, or the like, just before use.

The pH when the lyophilized formulation is dissolved in water is preferably 3 to 6, more preferably 3 to 5, further preferably 3 to 4.5, and particularly preferably 3.5 to 4.5. The above-described pH is suitable from the viewpoint of improving the re-solubility of the lyophilized formulation in aqueous solutions that are not strongly acidic.

The lyophilized formulations may be made by known methods for producing lyophilized formulations, and are not particularly limited as long as they are medicinally, pharmacologically (pharmaceutically) or physiologically acceptable. Examples of the method for lyophilization include a method which involves freezing at a temperature of −25° C. or less, and then drying while raising the temperature until the shelf temperature reaches 25 to 40 degrees, with the degree of vacuum in the dryer maintained at about 20 Pa or less.

The injection may be intravenous, subcutaneous, or intramuscular injections, or intravenous infusion.

The dosage of JPH203 or a pharmacologically acceptable salt thereof may be selected as appropriate depending on the extent of symptoms, the age, sex, or weight of the patient, difference in susceptibility, timing of administration, interval of administrations, or the like, but is preferably 1 mg/m$^2$ to 60 mg/m$^2$ (body surface area), and more preferably 10 mg/m$^2$ to 40 mg/m$^2$ (body surface area) at a time, from the viewpoint of efficacy and safety.

The cancer that the medicament for treating cancer may treat is bile duct cancer, colorectal cancer, esophageal cancer, breast cancer, or pancreatic cancer. Since JPH203 or a pharmacologically acceptable salt thereof exhibits tumor shrinkage effects and overall survival prolonging effects on bile duct cancer and colorectal cancer, a particularly high therapeutic effect can be expected on bile duct cancer and colorectal cancer. JPH203 or a pharmacologically acceptable salt thereof exhibits tumor shrinkage effects on esophageal cancer and breast cancer. JPH203 or a pharmacologically acceptable salt thereof exhibits overall survival prolonging effects on pancreatic cancer.

EXAMPLES

Injection Containing JPH203

The injection is a lyophilized formulation and contains 50 mg of JPH203 and 1200 mg of sulfobutyl ether-β-cyclodextrin in one vial.

Phase 1 Clinical Trial of JPH203 in Patients with Solid Cancer

This clinical trial involved patients with solid cancer. The object of this clinical trial was to evaluate the safety (dose limiting toxicity: DLT) and efficacy of JPH203.

The patient's primary inclusion criteria and exclusion criteria are as follows:

Inclusion Criteria
  Patients in advanced stage, who have been confirmed to have solid cancer and who are refractory or intolerant to standard therapy
  Patients whose biopsies or pre-existing tissues are available for LAT1 antibody staining
  Patients who can be expected to survive 90 days or more from the date of enrollment Exclusion Criteria
  Patients with serious or clinically problematic anamnesis or complications
  Patients who received chemotherapy, radiation therapy, immunotherapy, or other therapies aimed at tumor shrinkage effect within 4 weeks prior to study drug administration The background of the patients who participated in this clinical trial is as follows.

TABLE 1

| Patient | | n = 17 |
|---|---|---|
| Age | Median (range) | 65 years old (42 to 75 years old) |
| Sex | Male | 11 persons (65%) |
|  | Female | 6 persons (35%) |
| ECOG PS | 0 | 12 persons (71%) |
|  | 1 | 5 persons (29%) |
| Primary lesion | Colorectum | 6 persons (35%) |
|  | Bile duct | 5 persons (29%) |
|  | Pancreas | 4 persons (24%) |
|  | Esophagus | 1 person (6%) |
|  | Mammary gland | 1 person (6%) |
| Number of pretreatment regimen | 2 | 6 persons (35%) |
|  | 3 | 4 persons (24%) |
|  | 4 | 4 persons (24%) |
|  | 5 | 1 person (6%) |
|  | 6 | 2 persons (11%) |

The dosing schedule is as follows:
1) Single Administration
  On Day 1, a predetermined dosage was administered in a single dose. The dosage was 12 mg/m$^2$ (4 cases), 25 mg/m$^2$ (3 cases), 40 mg/m$^2$ (3 cases), 60 mg/m$^2$ (6 cases), or 85 mg/m$^2$ (1 case). One case of the 12 mg/m$^2$ dosage group was discontinued after only a single dose due to disease progression.
2) Cycle 1
  Cycle 1 was started 8 days or more after the single administration, and the injection was administered once daily for 7 consecutive days. Tests including CT were performed on days 28 to 31 from the start date of cycle 1 administration.
3) Cycle 2 and Later
  Within 28 days of the test day of the previous cycle, the next cycle was started and the injection was administered once daily for 7 consecutive days. Tests were performed on days 28 to 31 from the start date of administration.

DLT was the following symptoms occurring between the single administration and the test at the end of cycle 1 (from the start of cycle 1 to day 28) and for which the investigator (subinvestigator) determined that the relationship with the study drug could not be denied ("related," "probably related," "possibly related," or "unlikely related"). However, the final determination of DLT was made in consultation between the investigator and the sponsor. If necessary, advice from the Data and Safety Monitoring Board was sought upon determining DLT.

1) Non-hematologic toxicity of grade 3 or more for which the investigator (subinvestigator) determines that it is difficult to continue the administration of the study drug (except for acneform rash, maculo-papular rash, or urticaria of grade 3, and nausea, vomiting, inappetence, diarrhea, constipation, or fatigue that recovers to grade 1 by symptomatic therapy within 7 days after the occurrence)
2) Hematotoxicity of grade 4 or more or thrombocytopenia of grade 3 or more requiring blood transfusion
3) Febrile neutropenia The efficacy and safety results are summarized below.

TABLE 2

| Dosage | Effective case | DLT |
|---|---|---|
| 12 mg/m$^2$ | 2/3 | No |
| 25 mg/m$^2$ | 1/3 | No |
| 40 mg/m$^2$ | 1/3 | No |

TABLE 2-continued

| Dosage | Effective case | DLT |
|---|---|---|
| 60 mg/m² | 1/6 | Yes |
| 85 mg/m² | 0/1 | Yes |

DLT

AST/ALT increase of grade 3 was observed in the 60 mg/m² dosage group and the 85 mg/m² dosage group.

Efficacy

One case of a tumor size reduction of 30% or more (partial response: PR) was observed in the 12 mg/m² dosage group, while 1 case of no change in tumor size (stable: SD) was observed in each of the 12 mg/m² dosage group, the 25 mg/m² dosage group, the 40 mg/m² dosage group, and the 60 mg/m² dosage group. There was also a significant shrinkage effect in lymph node metastatic lesions in 3 out of 7 cases (55%, 69.4%, 80% shrinkage).

Figure 2:
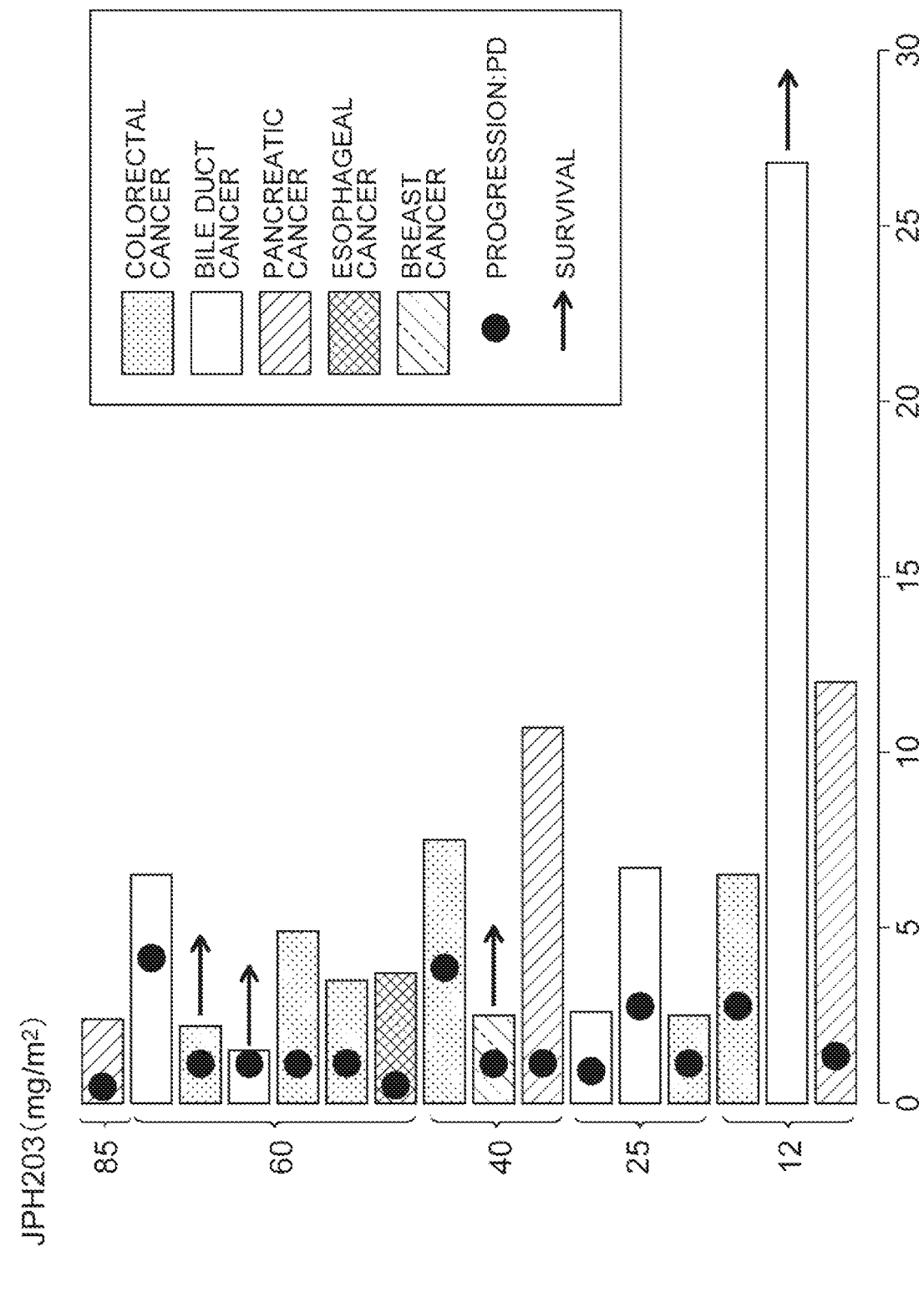
FIG. 2 is a graph showing a Swimmer plot of the phase I clinical trial results of JPH203.

FIG. 1 shows the Waterfall plot showing tumor shrinkage ratio for each subject. FIG. 2 shows the Swimmer plot representing months of survival for each subject. From FIG. 1, it was revealed that JPH203 exhibits tumor shrinkage effects on bile duct cancer, colorectal cancer, esophageal cancer, and breast cancer. It was also revealed from FIG. 2 that JPH203 exhibits survival prolonging effects on bile duct cancer, colorectal cancer, and pancreatic cancer. It should be noted that PD (progression) is when the sum of diameters of the target lesion is increased by 20% or more and the absolute value of sum diameters is increased by 5 mm or more compared to the smallest sum diameters measured at or after the baseline.

The invention claimed is:

1. A method for treating solid cancer, comprising:
   administering O-(5-amino-2-phenylbenzoxazol-7-yl)methyl-3,5-dichloro-L-tyrosine or a pharmacologically acceptable salt thereof at 1 mg/m² to 40 mg/m² once daily by intravenous injection to a human patient in need thereof,
   wherein the solid cancer is bile duct cancer, colorectal cancer, esophageal cancer, breast cancer, or pancreatic cancer.

2. The method according to claim 1, wherein the solid cancer is bile duct cancer, and O-(5-amino-2-phenylbenzoxazol-7-yl)methyl-3,5-dichloro-L-tyrosine or the pharmacologically acceptable salt thereof is administered at 25 mg/m² to 40 mg/m².

3. The method according to claim 1, wherein the solid cancer is colorectal cancer.

4. The method according to claim 1, wherein the solid cancer is esophageal cancer.

5. The method according to claim 1, wherein the solid cancer is breast cancer.

6. The method according to claim 1, wherein the solid cancer is pancreatic cancer.

7. The method according to claim 1, wherein the patient is refractory or intolerant to standard therapy.

8. A method for treating cancer, comprising:
   administering O-(5-amino-2-phenylbenzoxazol-7-yl)methyl-3,5-dichloro-L-tyrosine or a pharmacologically acceptable salt thereof to a patient in need thereof,
   wherein the cancer is bile duct cancer, colorectal cancer, or pancreatic cancer, and
   the patient is refractory or intolerant to standard therapy.

9. The method according to claim 8, wherein O-(5-amino-2-phenylbenzoxazol-7-yl)methyl-3,5-dichloro-L-tyrosine or a pharmacologically acceptable salt thereof is administered at 1 mg/m² to 60 mg/m² at a time.

10. The method according to claim 8, wherein the cancer is bile duct cancer.

11. The method according to claim 10, wherein O-(5-amino-2-phenylbenzoxazol-7-yl)methyl-3,5-dichloro-L-tyrosine or a pharmacologically acceptable salt thereof is administered at 12 mg/m² to 25 mg/m² at a time.

* * * * *